United States Patent
Hiremath et al.

(10) Patent No.: US 12,340,229 B2
(45) Date of Patent: Jun. 24, 2025

(54) AUTOMATED UPGRADE AND FALLBACK ACROSS MULTIPLE OPERATING SYSTEM INSTANCES

(71) Applicant: Rakuten Symphony, Inc., Tokyo (JP)

(72) Inventors: Prasad Hiremath, Bangalore (IN);
Amith Basavaraj, Bangalore (IN);
Lokesh Chimbili, Bangalore (IN);
Mahesh Sivapuram, Bangalore (IN);
Arun Menon, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/926,664

(22) PCT Filed: Nov. 16, 2022

(86) PCT No.: PCT/US2022/079922
§ 371 (c)(1),
(2) Date: Nov. 21, 2022

(87) PCT Pub. No.: WO2024/072470
PCT Pub. Date: Apr. 4, 2024

(65) Prior Publication Data
US 2024/0248724 A1 Jul. 25, 2024

(30) Foreign Application Priority Data
Sep. 28, 2022 (IN) .............................. 202241055504

(51) Int. Cl.
*G06F 9/4401* (2018.01)
*G06F 21/57* (2013.01)

(52) U.S. Cl.
CPC .......... *G06F 9/4406* (2013.01); *G06F 21/575* (2013.01)

(58) Field of Classification Search
None
See application file for complete search history.

(56) References Cited

U.S. PATENT DOCUMENTS 8,380,973 B2   2/2013   Cool et al.
9,542,195 B1   1/2017   Astarabadi et al.
(Continued)

OTHER PUBLICATIONS

International Search Report and Written Opinion for International Patent Application No. PCT/US22/79922 mailed Feb. 3, 2023.
(Continued)

*Primary Examiner* — Paul Yen
(74) *Attorney, Agent, or Firm* — Sughrue Mion, PLLC

(57) ABSTRACT

In general, the current subject matter relates to automated upgrade and fallback across multiple operating system ("OS") instances. In some implementations, automated upgrade and fallback across multiple OS instances can include attempting to boot an OS from a first Basic Input/Output System (BIOS) pre-stored in a first partition of a memory of a communication device in a wireless communication system. The OS can run on the communication device in response to the OS booting successfully from the first BIOS, and the method can further include, in response to the OS not booting successfully from the first BIOS, automatically attempting to boot the OS from a second BIOS pre-stored in a second partition of the memory of the communication device.

18 Claims, 15 Drawing Sheets

(56) References Cited

U.S. PATENT DOCUMENTS

| | | | |
|---|---|---|---|
| 2008/0148038 A1 | 6/2008 | Abe et al. | |
| 2014/0040605 A1 | 2/2014 | Futral et al. | |
| 2019/0364036 A1* | 11/2019 | Simpson | H04W 4/60 |
| 2021/0127294 A1* | 4/2021 | Kwak | H04W 28/0205 |
| 2022/0121751 A1* | 4/2022 | Wang | G06F 21/572 |

OTHER PUBLICATIONS

Dann Frazier, efibootmgr(8)—Linux main page, available at <https://linux.die.net/man/8/efibootmgr>, dated no later than Aug. 28, 2022.
GNU Grub Manual 2.06, Version 1.2, Nov. 2002, Chapter 5.1.2 "Chain-loading an OS".
Intelligent Platform Management Interface (IPMI) Specification Second Generation v2.0, Document Revision 1.1, Oct. 1, 2013.
Red Hat Enterprise Linux 8, Deploying and configuring single-node storage in Red Hat Enterprise Linux 8, Red Hat Customer Content Services, dated no later than Aug. 28, 2022, Chapter 20 "Setting up a remote diskless system," available at <https://access.redhat.com/documentation/en-us/red_hat_enterprise_linux/8/html/managing_storage_devices/setting-up-a-remote-diskless-system_managing-storage-devices>.

* cited by examiner

AUTOMATED UPGRADE AND FALLBACK ACROSS MULTIPLE OPERATING SYSTEM INSTANCES

CROSS-REFERENCE TO RELATED APPLICATIONS

The present application claims priority to and is the 35 U.S.C. 371 United States National Phase application based on International Patent Application No. PCT/US22/79922, filed Nov. 16, 2022, and entitled "Automated Upgrade and Fallback Across Multiple Operating System Instances," which claims priority to Indian Patent Application number 202241055504 filed Sep. 28, 2022, and entitled "Automated Upgrade and Fallback Across Multiple Operating System Instances," and incorporates is-their disclosures herein by reference in their entirety entireties.

TECHNICAL FIELD

In some implementations, the current subject matter relates to telecommunications systems, and in particular, to automated upgrade and fallback across multiple operating system ("OS") instances, such as for communication devices in wireless communication systems.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

A computer system at a cell, such as a base station and/or components of a base station, runs an operating system ("OS") to manage its operations including management of its hardware components and software resources. An OS may be installed on the computer system that is used initially when the hardware is deployed at the cell. The OS may, however, experience an error at some point during the computer system's operation that partially or fully impairs operation of the computer system. The computer system may thus be partially or fully non-operational, thereby impairing functionality of the cell site while the computer system experiences downtime. Further, traditionally, a maintenance worker physically visits the cell site to assess the errors and repair the OS, which may include a reinstallation of an OS on the computer system, such as if OS boot failure occurred. Waiting for a maintenance worker to reach the cell site and then address the OS error prolongs the downtime. Some computer systems may allow for remote OS repair or reinstallation, but such remote access of the computer system may not be secure and still requires manual intervention by a maintenance worker.

Additionally, an OS typically requires updating over time to address various issues such as newly located software bugs, provide improved security, and other issues. Traditionally, the computer system at the cell site must be taken offline while the OS updates, thereby impairing functionality of the cell site while the computer system experiences downtime.

SUMMARY

In some implementations, the current subject matter relates to a computer-implemented method. The method can include attempting to boot an operating system (OS) from a first Basic Input/Output System (BIOS) pre-stored in a first partition of a memory of a communication device in a wireless communication system. The OS can run on the communication device in response to the OS booting successfully from the first BIOS, and the method can further include, in response to the OS not booting successfully from the first BIOS, automatically attempting to boot the OS from a second BIOS pre-stored in a second partition of the memory of the communication device.

In some implementations, the current subject matter can include one or more of the following optional features.

In some implementations, the OS can run on the communication device in response to the OS booting successfully from the second BIOS, and the method can further include, in response to the OS not booting successfully from the second BIOS, automatically booting the OS from a third BIOS pre-stored in a third partition of the memory of the communication device. Further, the third BIOS can be pre-stored in the third partition of the memory during manufacturing of the communication device. Further, the first BIOS and the second BIOS can each be configured to be upgraded, and the third BIOS cannot be upgraded.

In some implementations, the method can further include during the running of the OS on the communication device, upgrading the second BIOS, and, in response to the second BIOS successfully upgrading, automatically rebooting the OS from the upgraded second BIOS. Further, the method can further include, after the rebooting and during the running of the OS on the communication device, upgrading the first BIOS, and, in response to the first BIOS successfully upgrading, automatically rebooting the OS from the upgraded first BIOS.

In some implementations, the first BIOS can have been pre-stored in the first partition of the memory during manufacturing of the communication device, the second BIOS can have been pre-stored in the second partition of the memory during manufacturing of the communication device, the second BIOS can be configured to be upgraded during the running of the OS booted successfully from the first BIOS, and the first BIOS can be configured to be upgraded during the running of the OS booted successfully from the second BIOS.

In some implementations, attempting to boot the OS from the first BIOS can include attempting to boot a first bootloader; and the method can further include, in response to the first bootloader boot failing, automatically attempting to boot the OS from the second BIOS, in response to the first bootloader boot succeeding, determining if bootloader booting has been attempted for the communication device more than a predetermined threshold number of times, in response to determining that the bootloader booting has not been attempted for the communication device more than the predetermined threshold number of times, continuing the attempt to boot the OS from the first BIOS, and, in response to determining that the bootloader booting has been attempted for the communication device more than the predetermined threshold number of times, automatically attempting to boot the OS from the second BIOS. Further, the method can further include, after continuing the attempt to boot the OS from the first BIOS, attempting to load a first kernel image of the first BIOS, in response to the first kernel image not successfully loading, triggering a reboot of the OS from the first BIOS, in response to the first kernel image successfully loading, attempting to load a first initrd image of the first BIOS, in response to the first initrd image not successfully loading, triggering a reboot of the OS from the first BIOS, and, in response to the first initrd image suc-cessfully loading, continuing the attempt to boot the OS from the first BIOS; and/or attempting to boot the OS from the second BIOS can include attempting to boot a second bootloader, and the method can further include, in response to the second bootloader boot failing, automatically booting the OS from a third BIOS pre-stored in a third partition of the memory of the communication device, in response to the second bootloader boot succeeding, determining if bootloader booting has been attempted more than the predetermined threshold number of times, in response to determining that the bootloader booting has not been attempted more than the predetermined threshold number of times, continuing the attempt to boot the OS from the second BIOS, and, in response to determining that the second bootloader booting has been attempted more than the predetermined threshold number of times, automatically attempting to boot the OS from the third BIOS. Further, the third BIOS can have been pre-stored in the third partition of the memory during manufacturing of the communication device. Further, the first BIOS and the second BIOS can each be configured to be upgraded, and the third BIOS cannot be upgraded.

In some implementations, the communication device can be a distributed unit (DU).

In some implementations, at least one of the attempting and the automatically attempting can be performed by a base station in the wireless communication system. Further, the base station can include at least one of an eNodeB base station, a gNodeB base station, a wireless base station, and any combination thereof.

In some implementations, the wireless communication system can be at least one of a long term evolution communications system, a new radio communications system, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

Figure 1A:
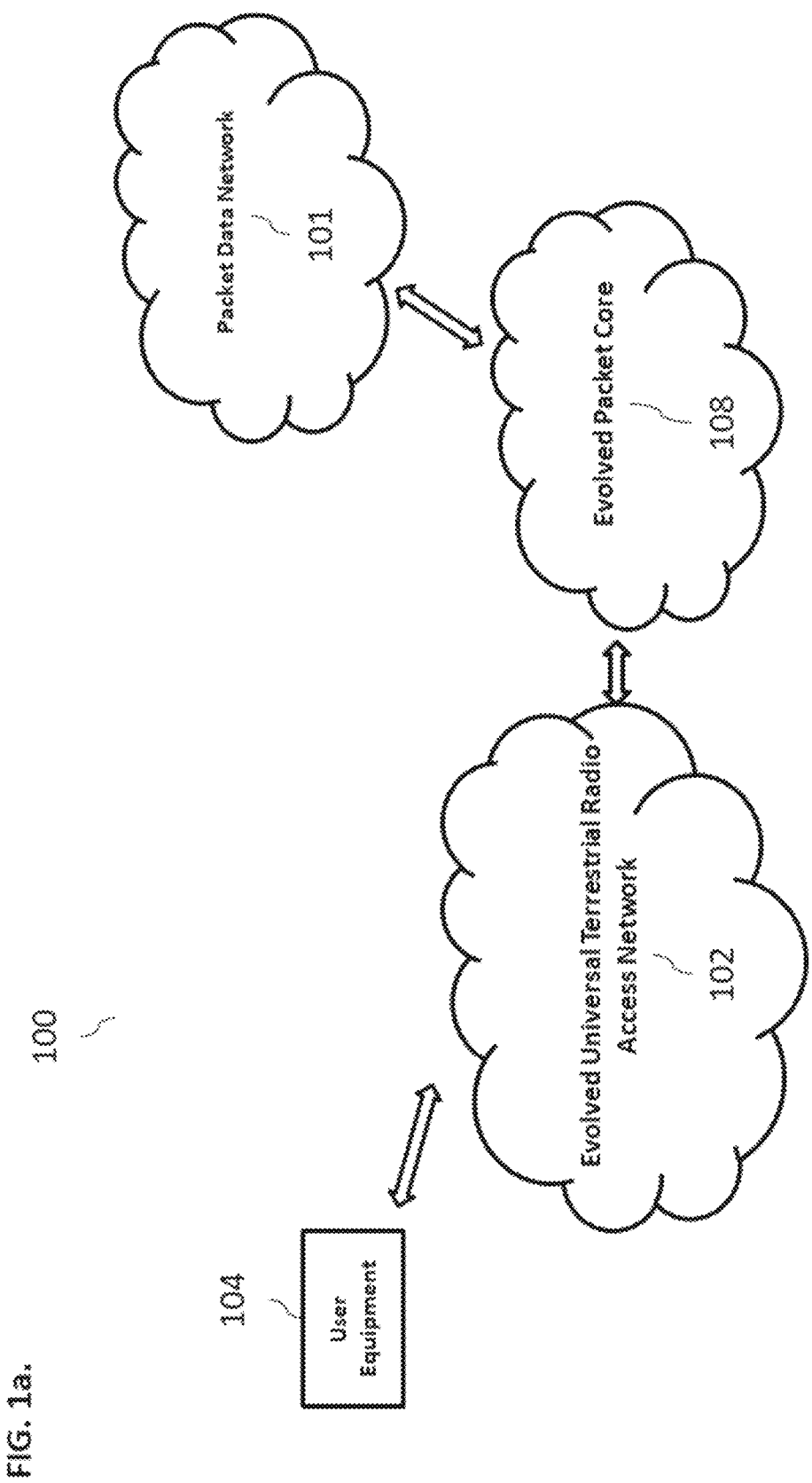
FIG. 1a illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In general, the current subject matter relates to automated upgrade and fallback across multiple operating system ("OS") instances.

In some implementations of the current subject matter, a computer system can have multiple instances of an OS installed thereon. The OS instances, also referred to herein as OS partitions, are partitioned from one another in a memory of the computer system. Thus, an error with one of the OS instances may be isolated from and not affect any of the other OS instances. In the event that an instance of the OS being booted is unable to boot successfully, the other OS instances may provide redundancy with one of the other OS instances being automatically booted.

In some implementations of the current subject matter, an OS can be attempted to be booted from a first Basic Input/Output System ("BIOS") pre-stored in a first partition of a memory of a computer system, e.g., a computer system of a communication device in a wireless communication system such as a long term evolution communications system, a new radio communications system, or other wireless communication system. The OS can run on the communication device in response to the OS booting successfully from the first BIOS. In response to the OS not booting successfully from the first BIOS, the OS can be automatically attempted to be rebooted from a second BIOS pre-stored in a second partition of the memory of the communication device.

In some implementations of the current subject matter, during the running of the OS on the communication device after the OS booted successfully from the first BIOS, the second BIOS can be upgraded. In response to the second BIOS successfully upgrading, the OS can be automatically rebooted from the upgraded second BIOS.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
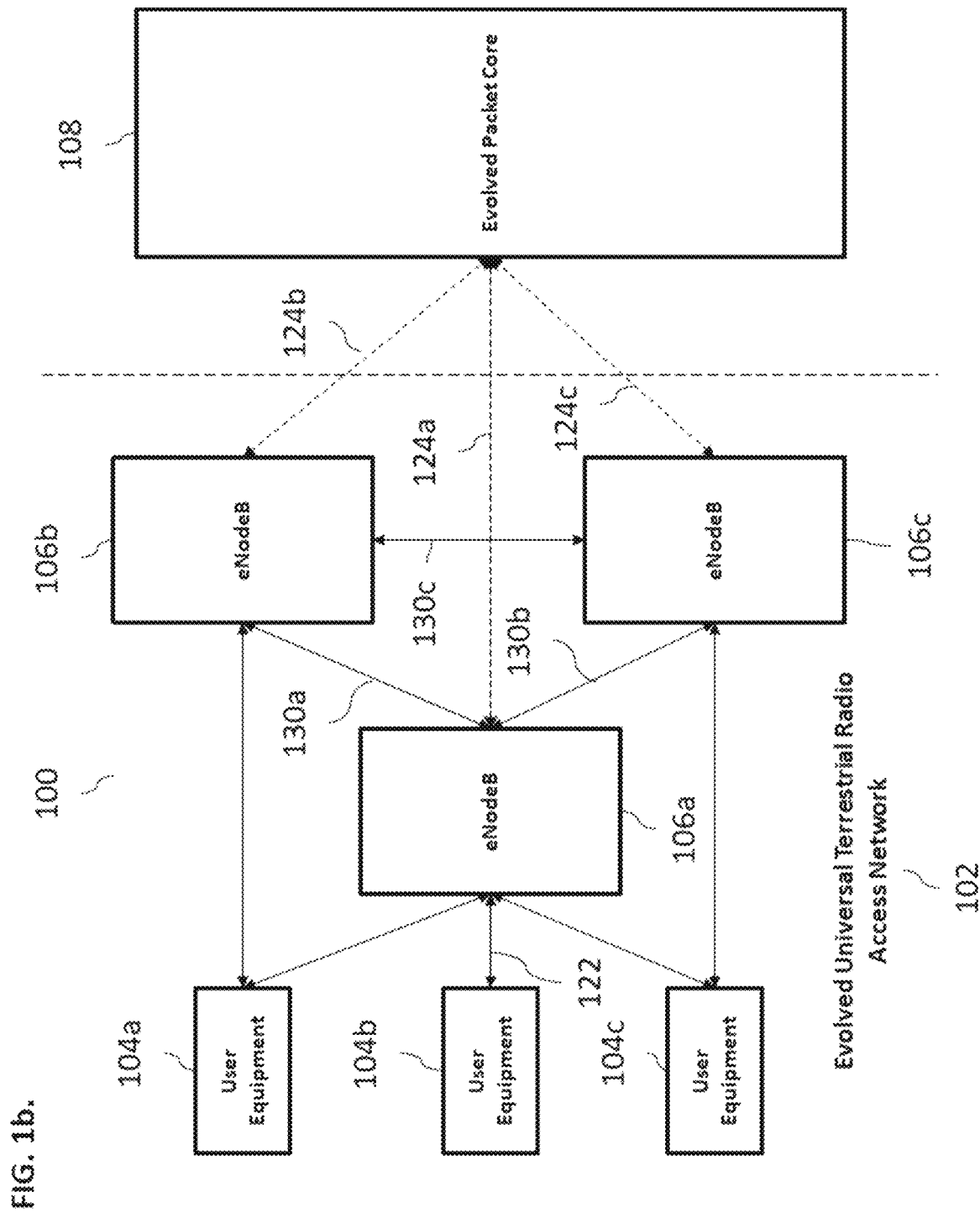

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
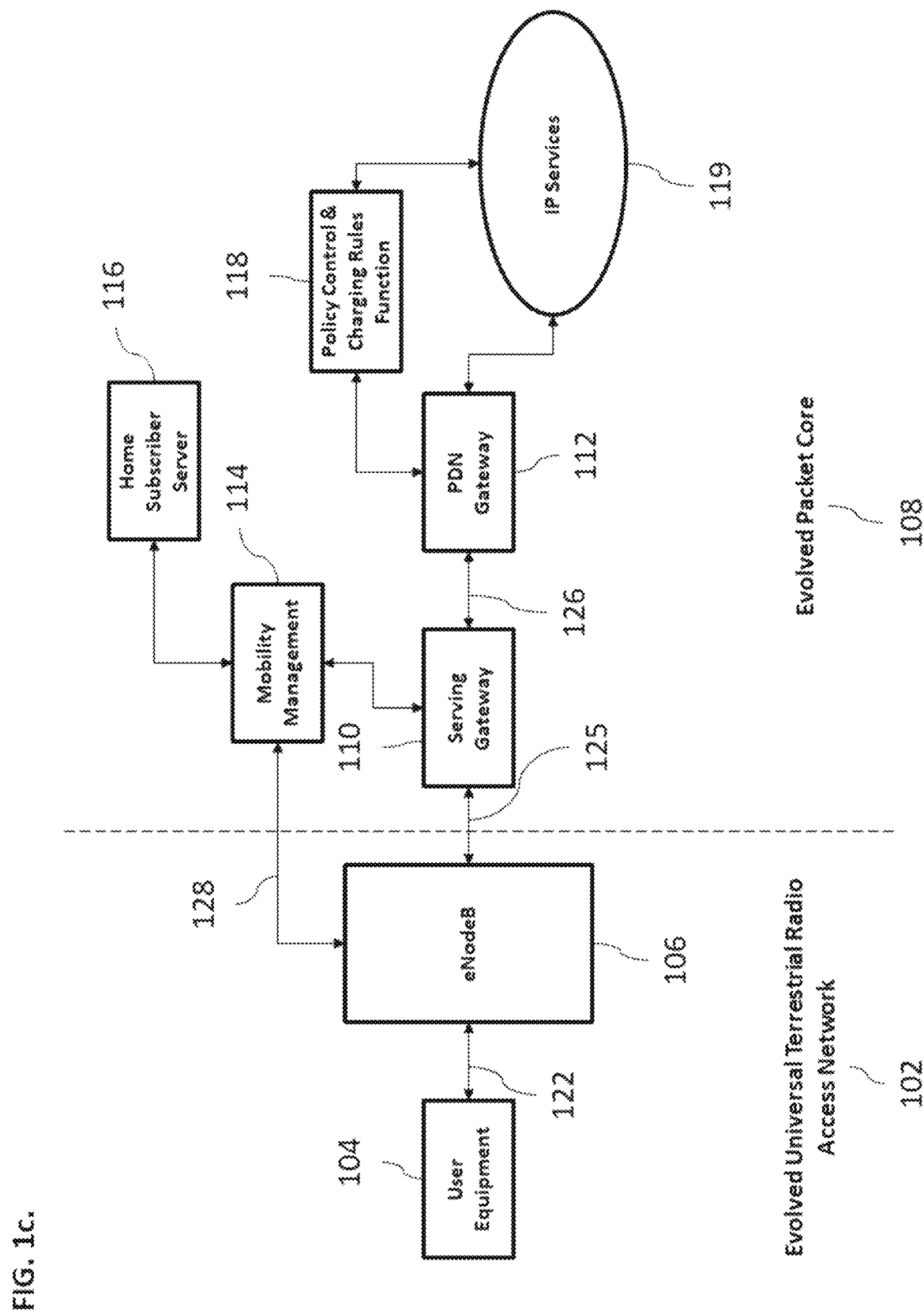

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
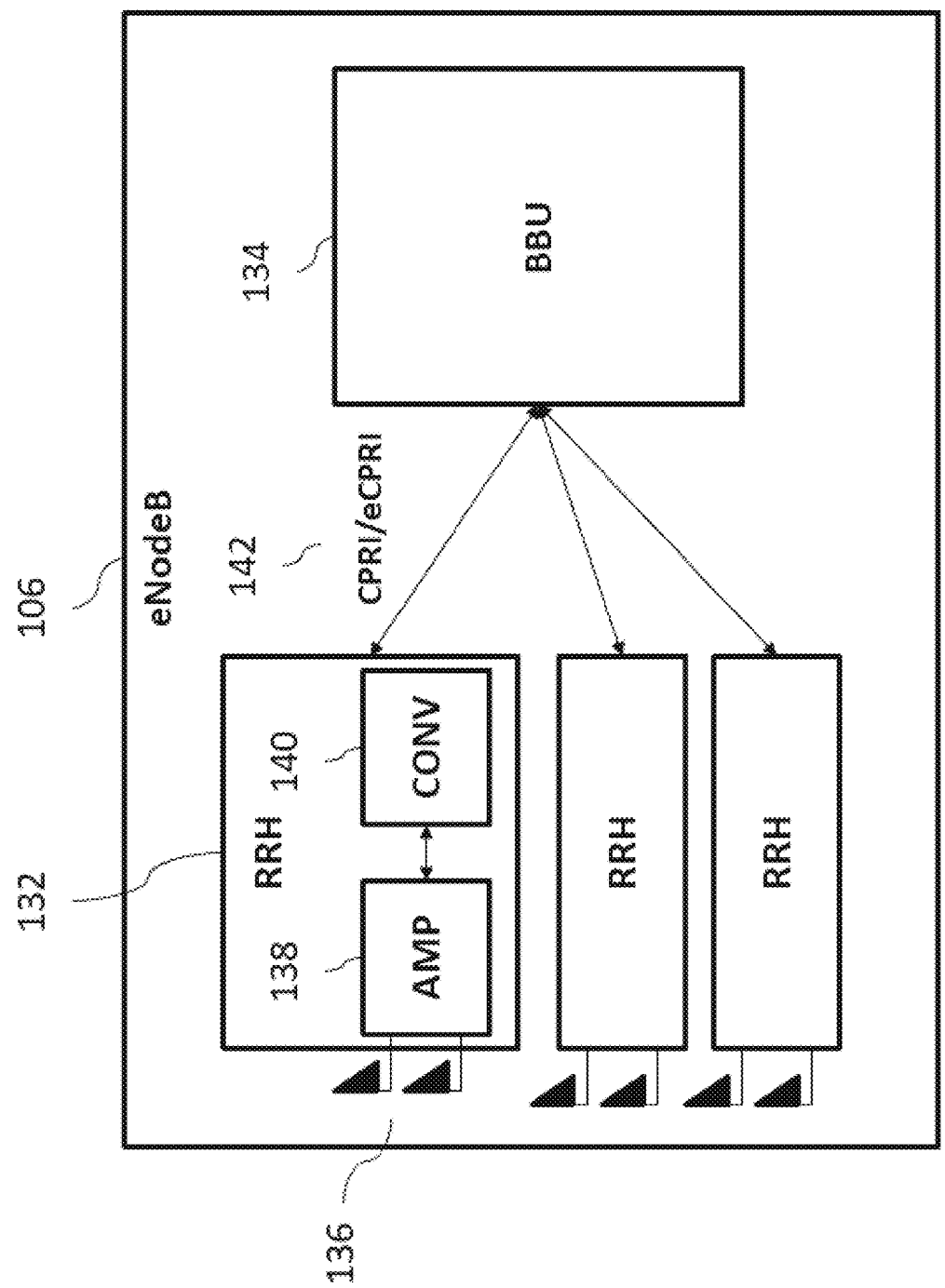

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
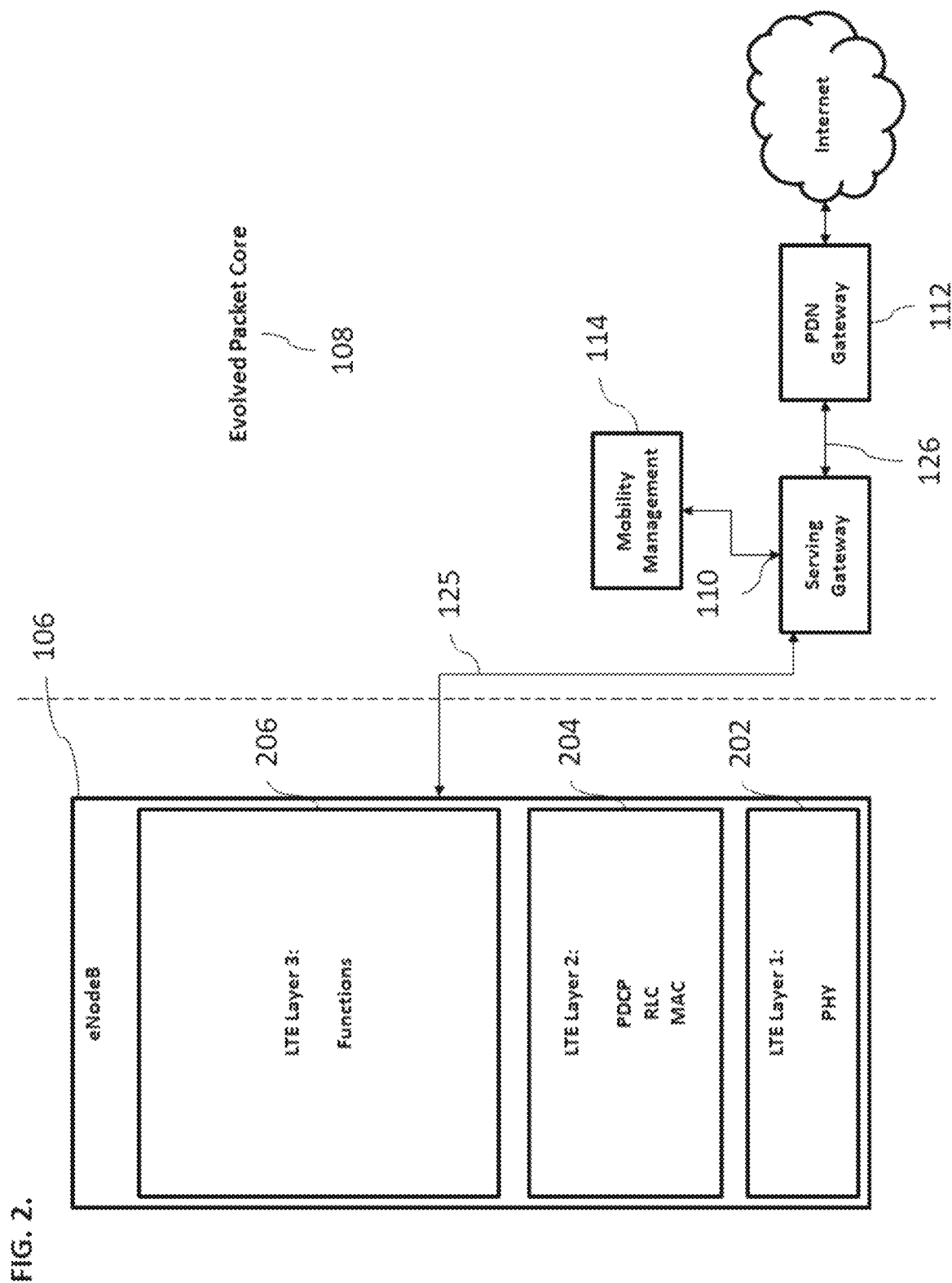
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
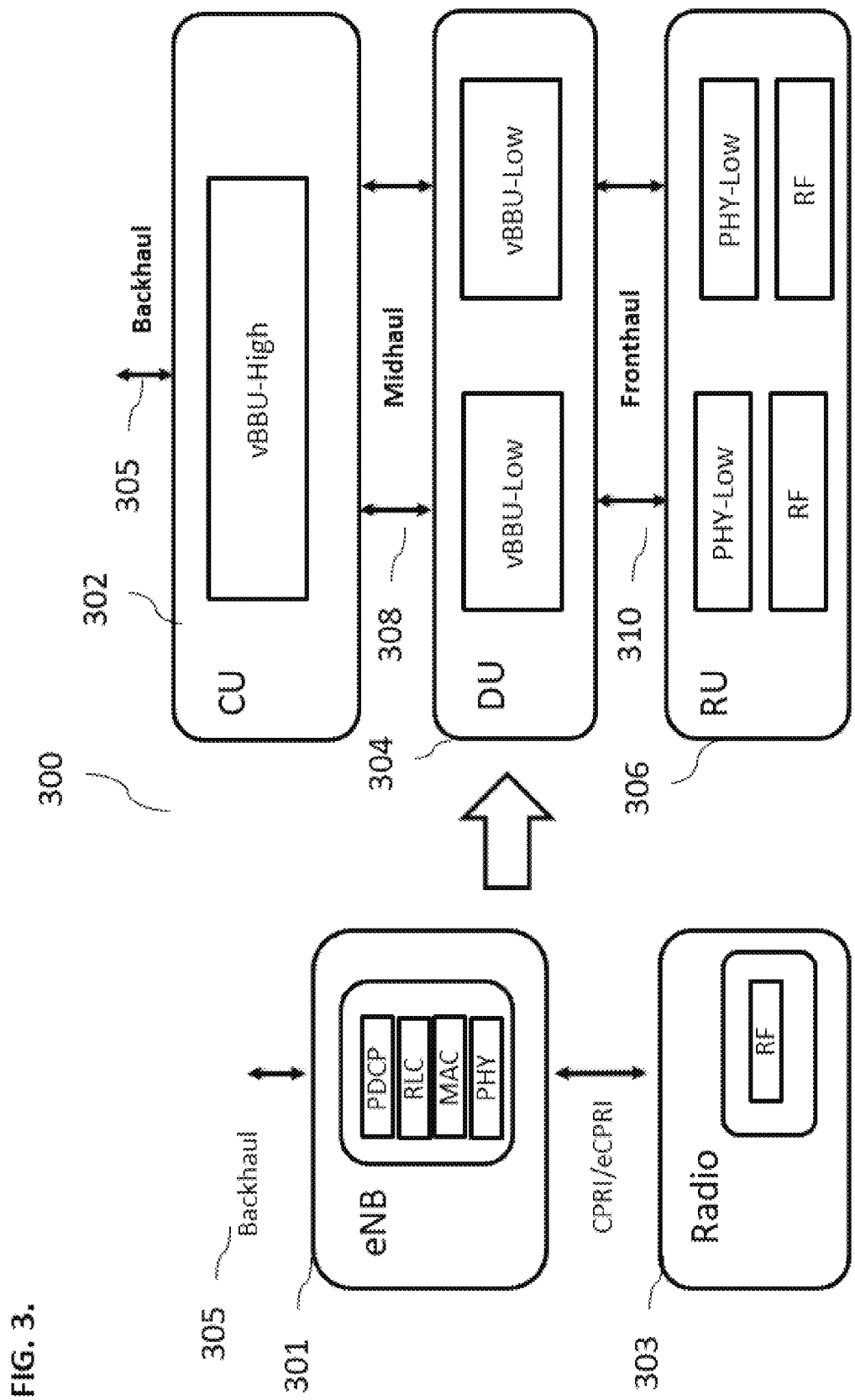
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
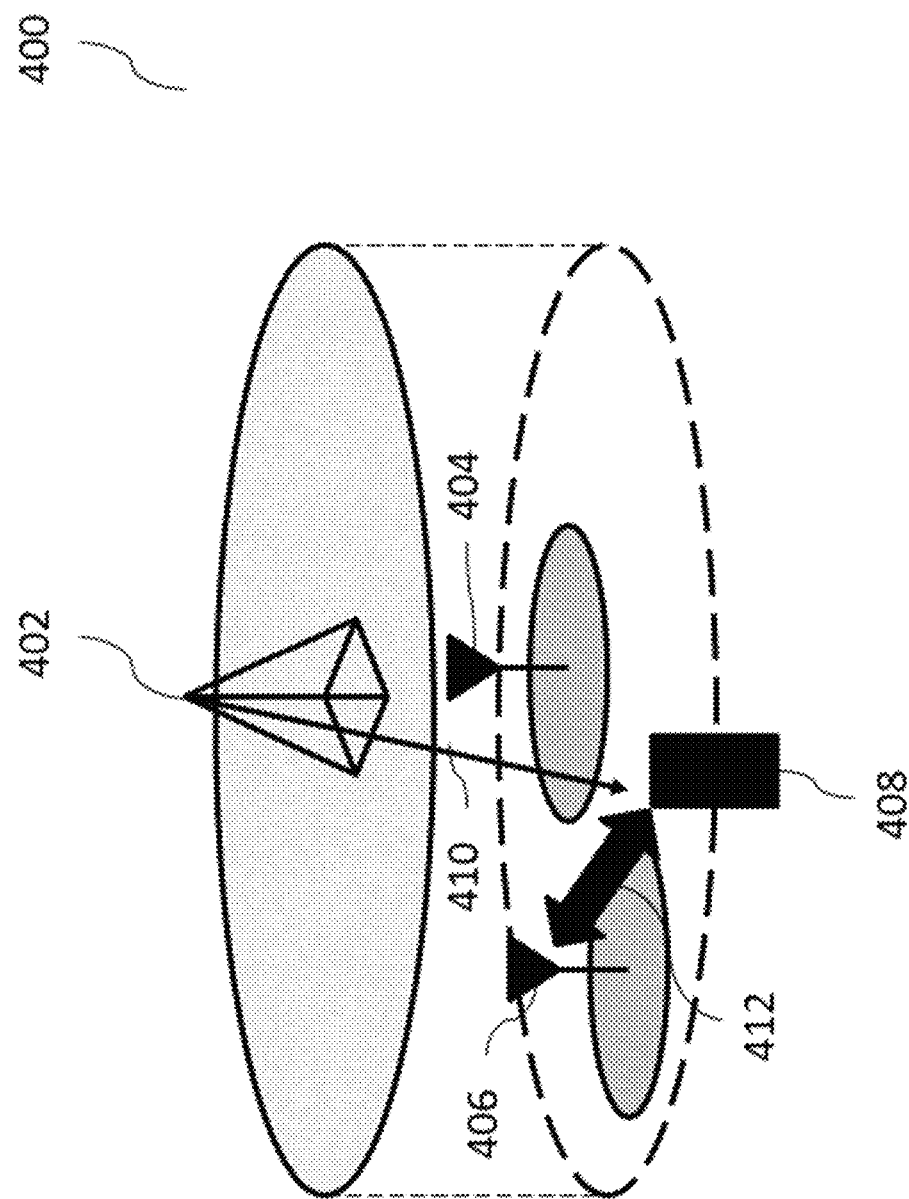
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
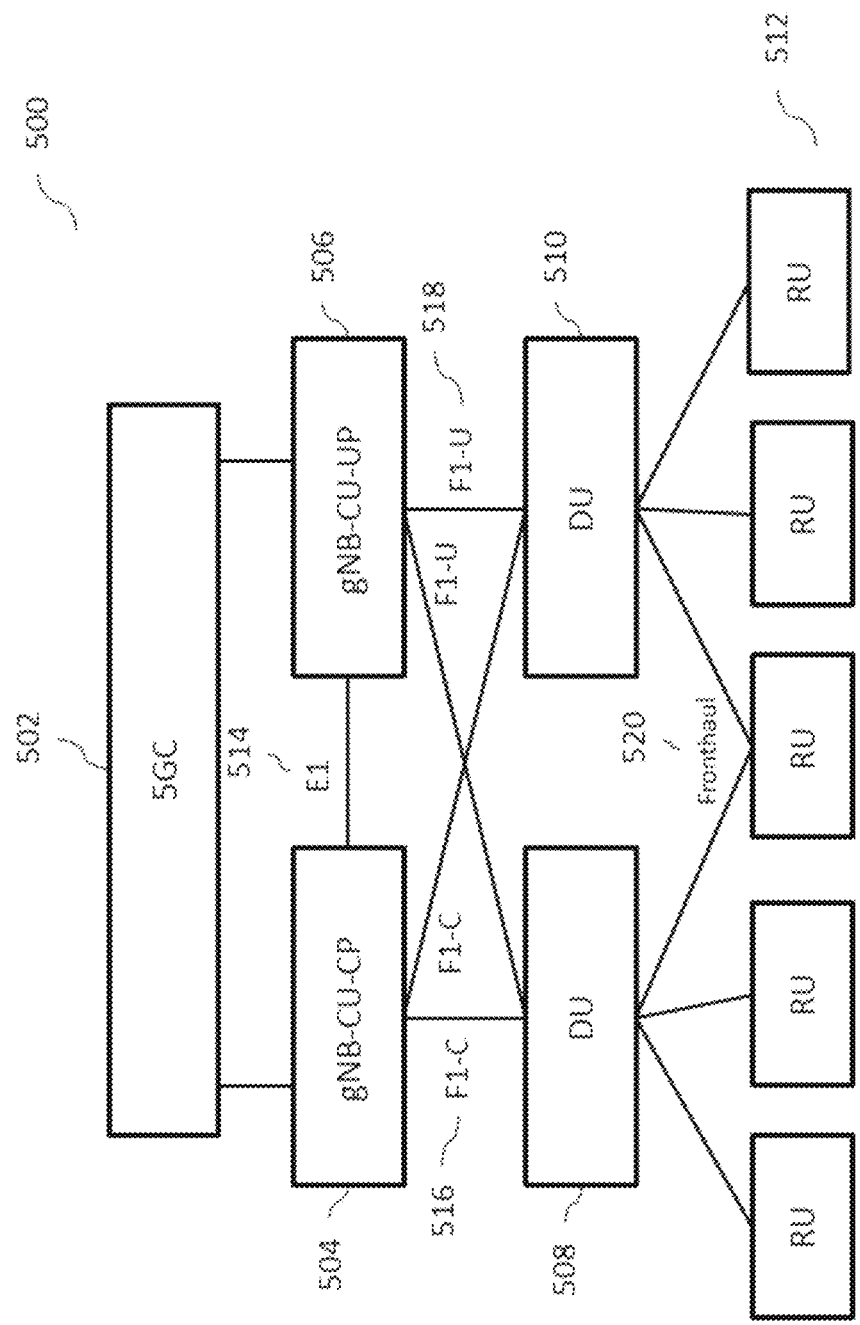
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
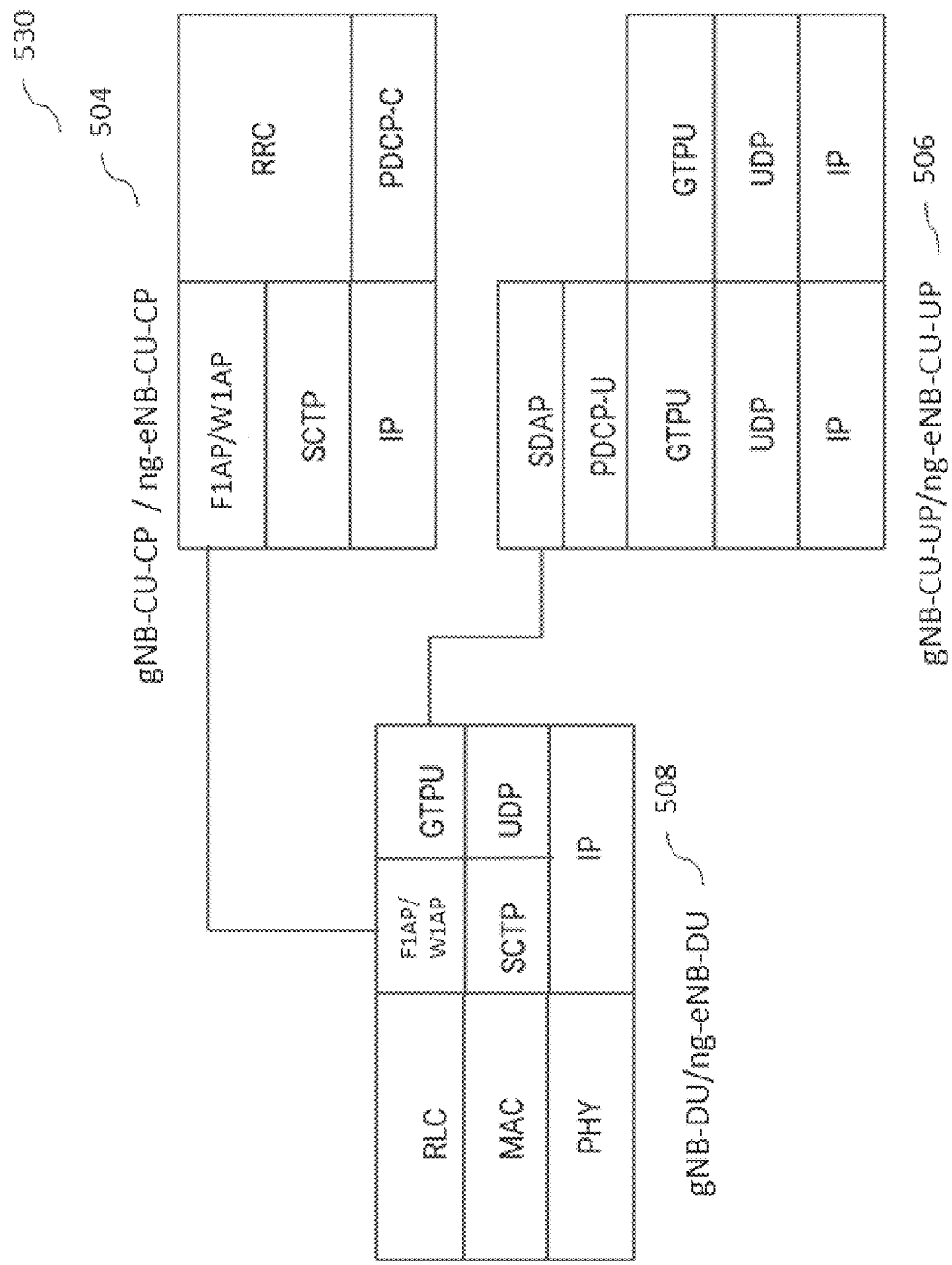
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
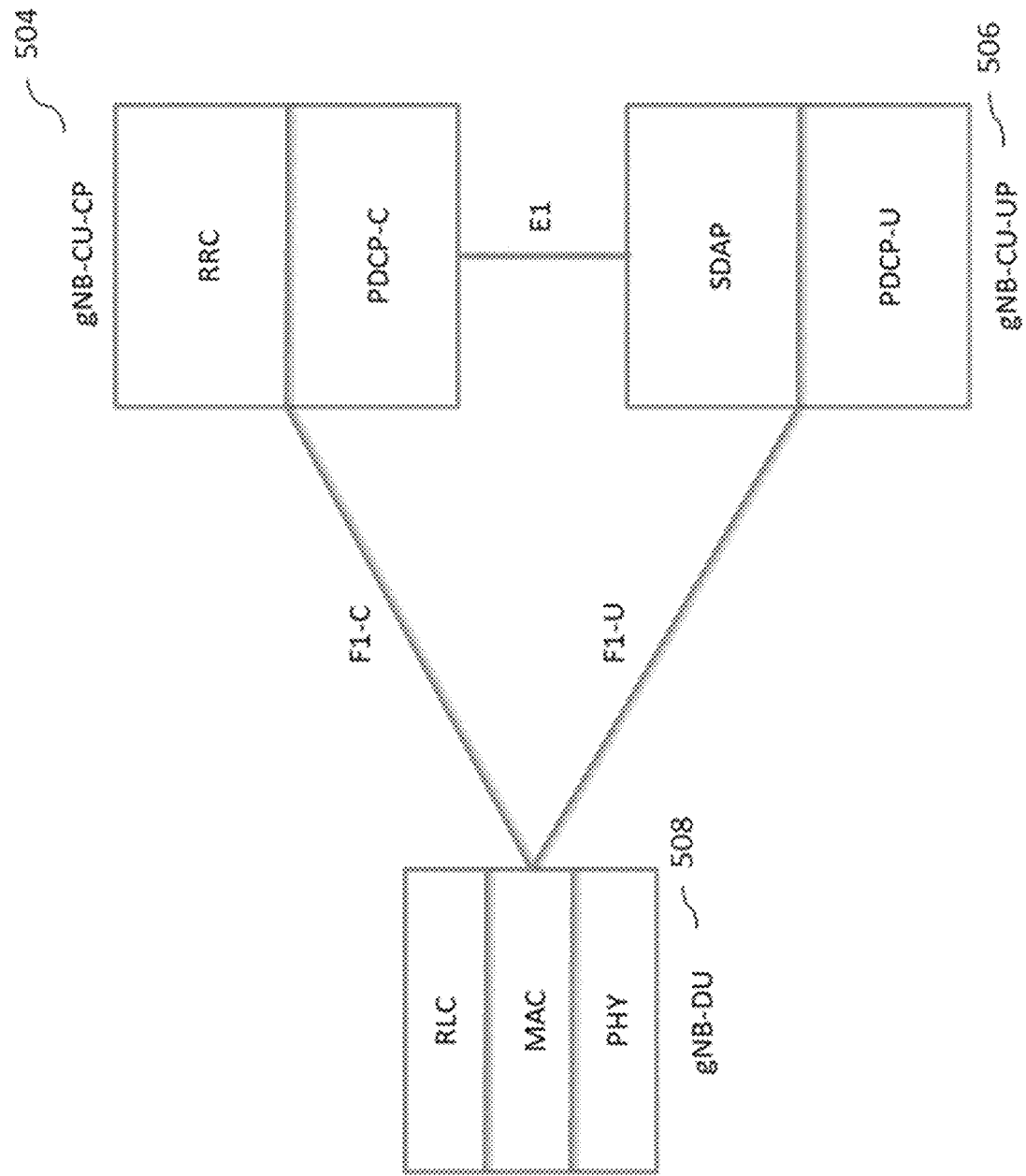
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Automated Upgrade And Fallback Across Multiple Operating System Instances

In some implementations of the current subject matter, a computer system (e.g., a computer system at a base station (e.g., gNodeB or gNB, eNodeB or eNB, ng-eNodeB or ng-eNB), such as those shown in and discussed above with regard to FIGS. 1a-5c, a commercial-off-the-shelf (COTS) server, etc.) can have multiple instances of an OS installed thereon. One of the OS instances may boot and run at a time. In the event that the instance of the OS being booted is unable to boot successfully, the other OS instances may provide redundancy with one of the other OS instances being automatically booted. The computer system may thus be booted and have OS functionality despite the computer system experiencing an OS boot failure. Human error may also be avoided. Further, the OS may be booted without requiring manual intervention, locally or remotely, to address the boot failure experienced by one of the OS instances. An OS may be unable to boot successfully for any of a variety of reasons, such as an error in installation of the OS on the computer system that prevents initial booting of the OS, a failure of the OS's bootloader during the boot process, a failure in loading the OS's kernal image during the boot process, a failure in loading the OS's initial RAM disk ("initrd") during the boot process, occurrence of kernal panic, or occurrence of a kernal failure or critical failure that prevents successful booting.

The OS instances, also referred to herein as OS partitions, are partitioned from one another in a memory of the computer system. Thus, an error with one of the OS instances, e.g., an error in installation, an error that occurs during the boot process, an error that occurs during running of the OS, an error that occurs during upgrading or as a result of upgrading an OS, etc., may be isolated from and not affect any of the other OS instances. Only one of the OS instances is configured to be booted and run at a time such that each of the OS instances is configured to provide complete OS functionality to the computer system. The OS instances may thus provide redundancy to reduce or avoid computer system downtime since regardless of which OS instance is booted, the computer system may be functional. Reducing or avoiding downtime may reduce the loss of revenue and degradation of key performance indicators ("KPIs") (accessibility) for the computer system's operator. When the computer system is a device in a wireless communications network, avoiding downtime may allow a cell site at which the computer system is located to remain fully functional and properly handle cell traffic as needed.

Each OS instance (other than a golden OS instance) can be configured to be upgraded independently from all the other OS instances. One of the OS instances may be a golden OS instance installed during manufacturing that cannot be upgraded, which may help ensure that the computer system always has a bootable OS available. Independent OS instance upgrading may help prevent any error that occurs with the OS instance being upgraded during or as a result of the upgrade from affecting any other OS instance. Independent OS instance upgrading may allow an OS instance to be upgraded without the computer system experiencing any downtime during the upgrade since the OS booted from another OS instance may be running during the upgrade.

Once an upgrade is successfully installed on an OS partition, the computer system can be configured to automatically reboot from the upgraded OS partition. The automatic rebooting may allow the upgrade to take effect as soon as possible, and thus more quickly achieve benefits of the upgrade, and without needing a person to manually cause the reboot, which may delay use of the upgrade at the computer system. The computer system experiences downtime during this reboot, but the downtime is significantly less than would be experienced if the computer system was down or in maintenance mode during the upgrade and if the computer system cannot successfully boot the upgraded OS (since the OS may be booted from one of the other partitions). Should the instance of the newly upgraded OS being booted be unable to boot successfully, the other OS instances may provide redundancy with one of the OS instances being automatically booted instead, as discussed herein.

In response to an OS instance being unable to boot successfully or unable to be upgraded successfully, a notification may be automatically generated and transmitted to an operations facility and/or an operations manager responsible for maintaining the computer system to provide notification of the boot failure or upgrade failure. The OS instance that failed to boot successfully or upgrade successfully may thus be assessed and repaired as needed, remotely and/or locally, such as by the operations manager who receives the notification or another maintenance worker who receives the notification directly or is otherwise informed of the need for assessment and/or repair as a result of the notification being transmitted to the operations facility and/or the operations manager. Such assessment and repair may not require any downtime of the computer system since another OS instance may be running to maintain functionality of the computer system despite an OS instance being unable to boot successfully or be upgraded successfully.

Figure 6:
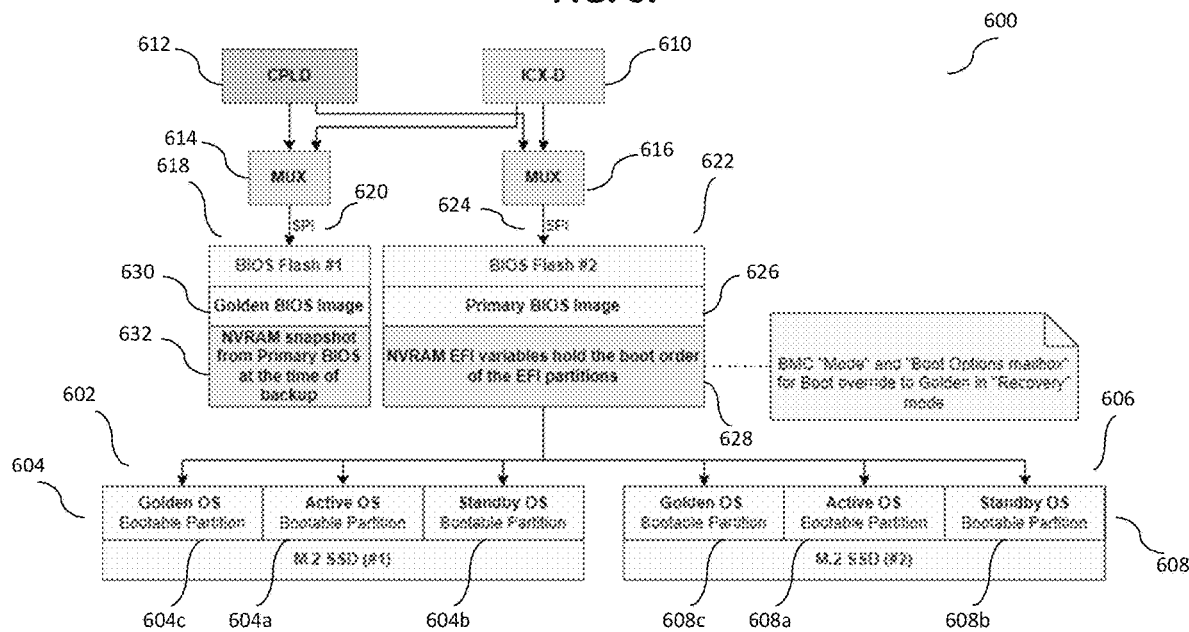
FIG. 6 illustrates a dual BIOS FLASH configuration of a device including a plurality of OS partitions, according to some implementations of the current subject matter.

FIG. 6 illustrates one implementation of a computer system 600 according to some implementations of the current subject matter. The computer system 600 can be for a communication device (e.g., a base station (e.g., gNodeB or gNB, eNodeB or eNB, ng-eNodeB or ng-eNB), such as those shown in and discussed above with regard to FIGS. 1a-5c) configured to be used in a wireless communication network, a COTS server, or other device.

The computer system 600 includes a first memory 602 that includes a plurality of OS partitions 604 (a first partition 604a, a second partition 604b, and a third partition 604c) and a second memory 606 that includes a plurality of OS partitions 608 (a first partition 608a, a second partition 608b, and a third partition 608c). Each of the first memory 602 and the second memory 606 includes three OS partitions 604, 608 in this illustrated implementation but can include another plurality number of partitions greater than three, e.g., four, five, etc. Having three partitions may allow for, as shown in FIG. 6, a first partition for an active OS that is the current OS to be booted or that is running, a second partition for a standby OS that is on standby for booting and running in the event that the active OS cannot be booted, and a third partition for a golden OS installed during manufacturing that is a backup for the active and standby partitions should each of the active and standby partitions be unable to be booted. Having more than three partitions may allow for at least one additional standby OS partition to be provided.

The first and second memories 602, 606 may each include one or more types of memories or storage devices. Each of the first and second memories 602, 606 is a solid state drive ("SSD") in the illustrated implementation of FIG. 6 but can be or includes at least one other type, such as nonvolatile memory express ("NVMe"), a disk device, or other type.

Each of the first and second memories 602, 606 may be associated with a particular component of the computer system 600. In other implementations, the computer system 600 may include only one memory. In still other implementations, the computer system 600 may include one or more additional memories each associated with a corresponding one or more additional components of the computer system 600. For example, in some implementations of the current subject matter, the computer system 600 can be associated with a base station, the first memory 602 can be associated with a first DU (e.g., a DU such as the DU 304 of FIG. 3, the DU 508 or 510 of FIGS. 5a-5c, etc.; etc.) of the base station, and the second memory 604 can be associated with a second DU (e.g., a DU such as the DU 304 of FIG. 3, the DU 508 or 510 of FIGS. 5a-5c, etc.; etc.) of the base station. Any additional DUs of the base station may each be associated with an additional memory that is configured and used similar to the memories 602, 606 discussed herein.

The computer system 600 may also include, as shown in the implementation of FIG. 6, a processor 610, a complex programmable logic device ("CPLD") 612, a first multiplexor ("MUX") 614 communicatively coupled with the processor 610 and the CPLD 612, a second MUX 616 communicatively coupled with the processor 610 and the CPLD 612, a first BIOS 618 communicatively coupled with the first MUX 614 (e.g., via a first serial peripheral interface ("SPI") 620), and a second BIOS 622 communicatively coupled with the second MUX 616 (e.g., via a second SPI 624), the first memory 602, and the second memory 606. The processor 610 is an Ice Lake Xeon D ("ICX-D") (Intel® Xeon® D processor) in this illustrated implementation but can be another type of processor.

As shown in the implementation of FIG. 6, the second BIOS 622 may include contents stored in a FLASH memory. The contents may include a primary BIOS image 626 and NVRAM 628. As also shown in the implementation of FIG. 6, the first BIOS 618 may include contents stored in a FLASH memory. The contents may include a golden BIOS image 630 and NVRAM 632. The NVRAM 632 of the first BIOS 618 may store a snapshot of the primary BIOS image 626 at a time of backup, which may help ensure version lock and that the golden OS always remains bootable. The NVRAM 628 of the second BIOS 632 may store extensible firmware (EFI) variables that store a first boot order for the first plurality of partitions 604a, 604b, 604c of the first memory 604 and a second boot order for the second plurality of partitions 608a, 608b, 608c of the second memory 606.

Boot order indicates a priority order of the partitions from which the OS should be attempted to be booted. The processor 610 is configured to cause OS booting according to the boot order, as discussed herein. A first one of the OS partitions in the boot order is considered the active OS and is also referred to herein as the "current partition" to reflect that it is the current partition prioritized for booting or the current partition whose OS is running as having been successfully booted. The active OS is the first OS to be attempted to be booted and therefore, if successfully booted, be the OS actively running. The active OS is also referred A second one of the OS partitions in the boot order is considered the standby OS. The standby OS is the OS to be attempted to be booted in the event of active OS boot failure, as discussed further herein. A third one of the OS partitions in the boot order is the golden OS. The golden partition being last in the boot order generally reflects that one or more of the others of the plurality of partitions may have been upgraded and thus be a more preferable OS to run than the OS of the golden partition.

The plurality of partitions are ordered in a boot order stored in the non-volatile random access memory (NVRAM) 628. Over time, the partitions in the boot order may change places as the active and standby partitions change designations, e.g., the standby partition becoming the active partition and the active partition become the standby partition, as discussed further herein. The golden partition always remains the golden partition and always remains last in the boot order.

FIG. 6 reflects a boot order for the first plurality of partitions 604: the first partition 604a (labeled as the "Active OS" in FIG. 6), the second partition 604b (labeled as the "Standby OS" in FIG. 6), and the third partition 604c (labeled as the "Golden OS" in FIG. 6). FIG. 6 also reflects a boot order for the second plurality of partitions 608: the first partition 608a (labeled as the "Active OS" in FIG. 6), the second partition 608b (labeled as the Standby OS in FIG. 6), and the third partition 608c (labeled as the Golden OS in FIG. 6).

It may be possible to override the boot order to force a boot from an OS partition that is not next in the boot order. The override may be performed locally or remotely through manual intervention by a maintenance worker who has authorized access to the computer system 600. For example, as shown in FIG. 6, in a "Recovery" mode, the golden OS of a plurality of partitions (e.g., the golden partition 604c or the golden partition 608c) may be forced to be first in the boot order. Since the golden OS is installed during manufacturing and cannot be upgraded, forcing a boot from the golden OS partition may help ensure that an OS is booted, which may be useful in repairing the computer system 600, in assessing error(s), etc. Booting of the golden partition (e.g., the golden partition 604c or the golden partition 608c) may be achieved via a restore operation via the CPLD 612, which is configured to copy contents of the golden BIOS image 630 to the primary BIOS image 626 to attempt booting using the golden OS.

Figure 7:
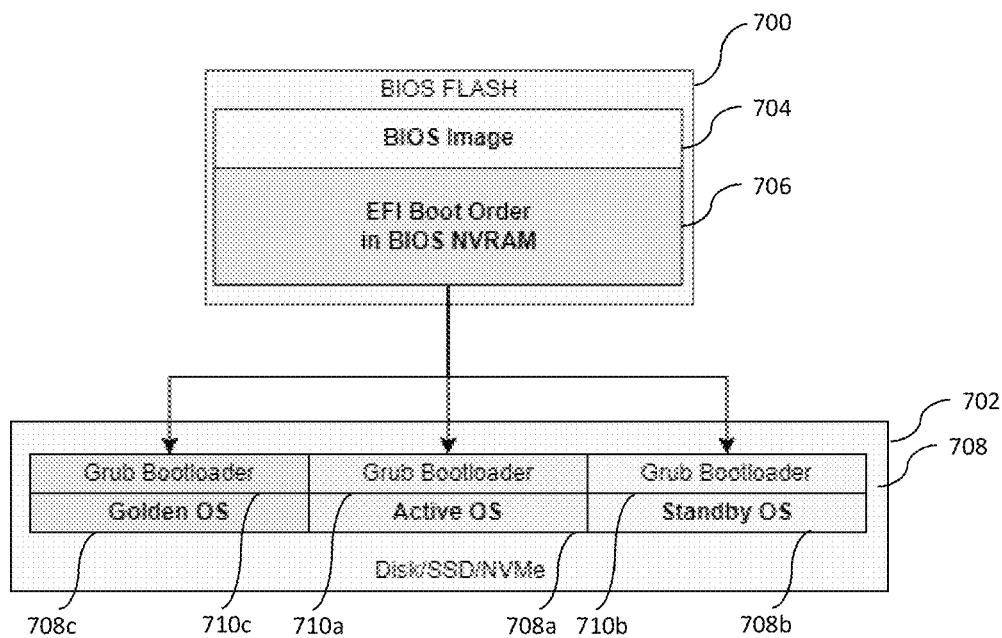
FIG. 7 illustrates a configuration of a device including a plurality of OS partitions having a first set of designations, according to some implementations of the current subject matter.
Figure 8:
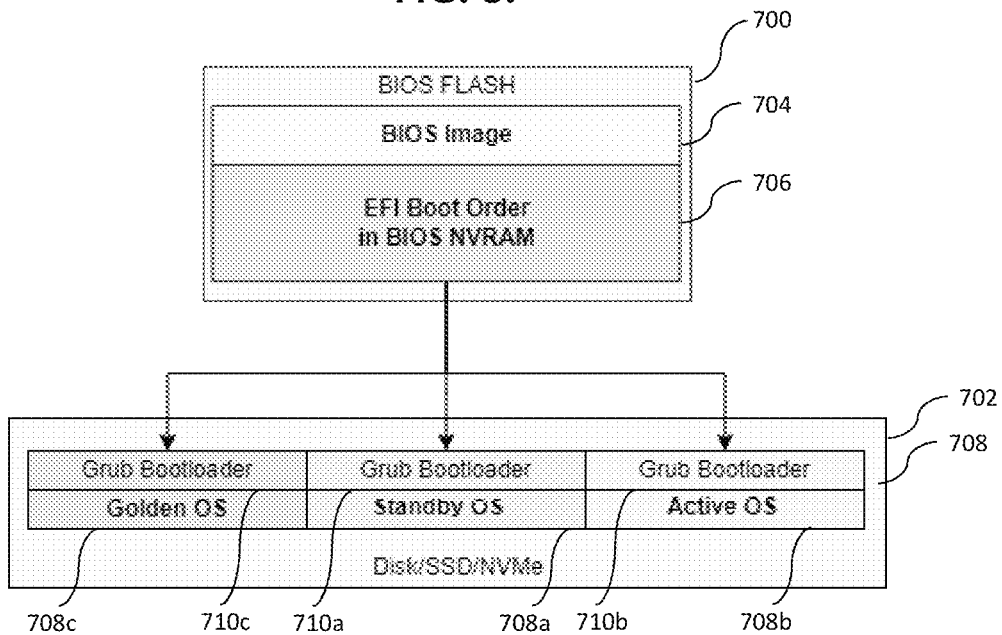
FIG. 8 illustrates the configuration of FIG. 7 with the plurality of OS partitions having a second set of designations, according to some implementations of the current subject matter.

FIGS. 7 and 8 illustrate a changing of boot order over time according to some implementations of the current subject matter. FIGS. 7 and 8 illustrate a BIOS 700 (e.g., the first BIOS 618 of FIG. 6, etc.) communicatively coupled with a memory 702 (e.g., the first memory 602 or the second memory 606 of FIG. 6, etc.). The BIOS 700 include contents stored in a FLASH memory, where the contents may include a primary BIOS image 704 (e.g., the primary BIOS image 626 of FIG. 6, etc.) and NVRAM 706 (e.g., the NVRAM 628 of FIG. 6, etc.). The memory 702 includes a plurality of OS partitions 708 (a first partition 708a, a second partition 708b, and a third partition 708c) (e.g., the OS partitions 604 or the OS partitions 608 of FIG. 6, etc.). The memory 702 in this illustrated implantation includes a disk device, an SSD, and NVMe, but as discussed herein, the memory 702 may include one or more types.

FIG. 7 reflects a boot order for the plurality of partitions 708: the first partition 708a (labeled as the "Active OS" in FIG. 7), the second partition 708b (labeled as the "Standby OS" in FIG. 7), and the third partition 708c (labeled as the "Golden OS" in FIG. 7). FIG. 8 reflects that the Active and Standby partitions have changed designations, with the boot order now being: the second partition 708b (labeled as the "Active OS" in FIG. 8), the first partition 708a (labeled as the "Standby OS" in FIG. 8), and the third partition 708c (labeled as the "Golden OS" in FIG. 8). The boot order shown in FIG. 8 reflects that the first partition 708a failed to boot and that the second partition 708b is to be attempted to be booted instead. The partitions in the boot order may change back to the boot order shown in FIG. 7 in the event of failure of the second partition 708b to boot. The partitions in the boot order may change any number of times during use of the device that includes the BIOS 700 and the memory 702.

FIG. 6-8 illustrate implementations according to the current subject matter in which a single memory includes multiple OS instances that have a boot order, e.g., the first memory 602 of FIG. 6 including multiple OS partitions 604, the second memory 606 of FIG. 6 including multiple OS partitions 608, and the memory 702 of FIGS. 7 and 8 including multiple OS partitions 708. In other implementations according to the current subject matter, a plurality of memories may each include a single OS instance where the OS instances collectively have a boot order. In still other implementations according to the current subject matter, a plurality of memories may each include a multiple OS instances where the OS instances collectively have a boot order. In yet other implementations according to the current subject matter, a plurality of memories may be combined in various redundant array of independent (or inexpensive) disks ("RAID") configurations. The bootable RAID volume would include multiple OS instances.

Figure 9:
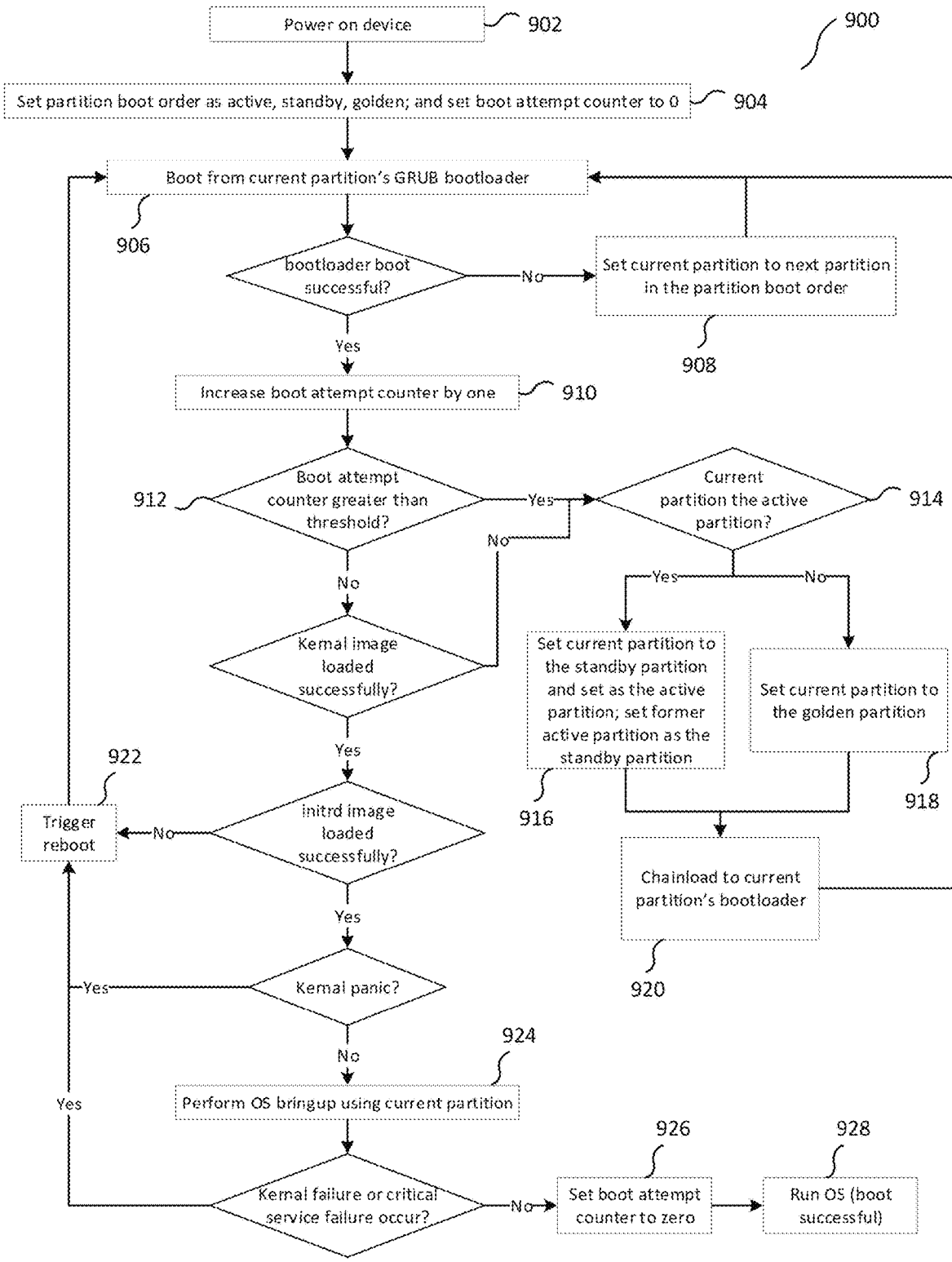
FIG. 9 illustrates a method for performing automated fallback across multiple OS instances, according to some implementations of the current subject matter.

FIG. 9 illustrates one implementation of a method 900 for performing automated fallback across multiple OS instances, according to some implementations of the current subject matter. The method 900 is described with respect to the implementation of FIGS. 7 and 8 for ease of explanation but can be implemented using another device, such as the device of FIG. 6, etc., and with other configurations of memories and OS instances as discussed above. The method 900 may be executed by a base station (e.g., one or more base stations 106 of FIGS. 1*b*-2, base station 301 of FIG. 3, etc.) and/or one or more of its components that may incorporate one or more components of a computer system, such as the computer system 600 of FIG. 6, the computer system of FIGS. 7 and 8, a computer system 1100 of FIG. 11, etc.

As shown in FIG. 9, the method 900 may include powering on 902 the device. The powering on 902 may trigger a plurality of setup actions 904 related to OS booting.

The setup actions 904 may include setting a boot order of the partitions 708 and storing the boot order in the NVRAM 706 of the BIOS 700, e.g., the processor causing the setting and the storing. The boot order in this implementation is set and stored as shown in FIG. 7: the first partition 708*a* (labeled as the "Active OS" in FIG. 7), the second partition 708*b* (labeled as the "Standby OS" in FIG. 7), and the third partition 708*c* (labeled as the "Golden OS" in FIG. 7). The first partition 708*a*, being first in the boot order, is labeled as the "Active OS" in FIG. 7. The first partition 708*a*, being first in the boot order, is the current partition. The second partition 708*b*, being second in the boot order, is labeled as the "Standby OS" in FIG. 7. The third partition 708*c*, being third and last in the boot order, is labeled as the "Golden OS" in FIG. 7.

The setup actions 904 may also include setting a boot attempt counter to zero, e.g., the processor causing the stored boot attempt counter to be zero. The boot attempt counter may be stored at the BIOS 700, e.g., in the NVRAM 706, or elsewhere accessible to the BIOS 700. The boot attempt counter may be set to zero before or after the boot order is set.

After the boot order has been set, the method 900 continues by starting OS booting from the current partition with a boot 906 from a bootloader of the current partition, FIGS. 7 and 8 show a first Grand Unified Bootloader (GRUB) bootloader 710*a* of the first partition 708*a*, a GRUB bootloader 710*b* of the second partition 708*b*, and a GRUB bootloader 710*c* of the third partition 708*c*. If the bootloader boot 906 is unsuccessful, the current partition cannot be booted. Thus, in response to bootloader boot 906 failure, a next partition in the boot order is set 908 as the current partition, which in this illustrated implementation is the second partition 708*b*. The method 900 then continues by booting 906 the bootloader of the current partition, which is now the second GRUB bootloader 710*b* of the second partition 708*b*. If the bootloader boot 906 is unsuccessful, the Standby OS cannot be booted. Thus, in response to bootloader boot 906 failure, a next partition in the boot order is set 908 as the current partition, which in this illustrated implementation is the third partition 708*c*. The method 900 then continues by booting 906 the bootloader of the current partition, which is now the third GRUB bootloader 710*c* of the third partition 708*c*. The Golden OS has thus started to be booted.

If the bootloader boot 906 of the first GRUB bootloader 710*a* is successful, the current partition can continue attempting to be booted. The method 900 may thus include increasing 910 the boot attempt counter by one, e.g., the processor causing the stored boot attempt counter to increase by one.

The method 900 may include determining 912, e.g., the processor determining, whether the boot attempt counter is greater than a threshold. The threshold may reflect a maximum number of times that the current partition may be attempted to be booted before the current partition is deemed to be unbootable such that the next partition in the boot order should be used for OS booting. The value of the threshold may be preset and stored at the BIOS 700, e.g., in the NVRAM 706, or elsewhere accessible to the BIOS 700. The value of the threshold may be chosen based on any of a variety of factors, such as a processing power of the processor, a tolerance for downtime in OS booting, etc.

In response to determining 912 that the boot attempt counter is greater than the threshold, the method 900 may include determining 914, e.g., the processor determining, whether the current partition is the active partition. If the current partition is determined 914 to be the active partition, the method 900 may include changing 916 partition designations for the boot order so the standby partition becomes the current partition. This change 916 reflects that booting of the active OS has failed enough times that the standby OS should be attempted to be booted instead. The current partition is set to be the standby partition, the standby partition is designated as the active partition, and the formerly active partition is set as the standby partition. This change in the designations is reflected in the difference between FIGS. 7 and 8 where the first partition 708*a* changed from being the Active OS to being the Standby OS and the second partition 708*b* changed from being the Standby OS to being the Active OS.

If the current partition is determined 914 to not be the active partition, the method 900 may include changing 918 partition designations for the boot order so the golden partition becomes the current partition. This change 918 reflects that booting of the active OS and the standby OS has each failed enough times that the golden OS should be attempted to be booted instead.

After changing 916 the current partition to the standby partition or changing 918 the current partition to the golden partition, the method 900 may include chainloading 920 to the current partition's bootloader, e.g., the GRUB bootloader 710*b* of the second partition 708*b* (when the current partition was changed 916 to the standby partition) or the GRUB bootloader 710*c* of the third partition 708*c* (when the current partition was changed 918 to the golden partition).

The method 900 then continues by booting 906 the bootloader of the current partition.

In response to determining 912 that the boot attempt counter is not greater than the threshold, the method 900 may continue attempting the OS boot by attempting to load the current partition's kernal image. If the kernal image loading is unsuccessful, the current partition cannot be booted. Thus, in response to kernal image loading failure, the method 900 may include determining 914, e.g., the processor determining, whether the current partition is the active partition, as discussed above.

If the kernal image loading is successful, the current partition can continue attempting to be booted by attempting to load the current partition's initrd image. If the initrd image loading is unsuccessful, the current partition cannot be booted. Thus, in response to kernal image loading failure, the method 900 may include triggering 922 a reboot of the OS from the current partition, starting with a boot 906 from a bootloader of the current partition, as discussed above.

If the initrd image loading is successful, the current partition can continue attempting to be booted. If kernal panic occurs as the current partition continues to be booted, the method 900 may include triggering 922 a reboot of the OS from the current partition, starting with a boot 906 from a bootloader of the current partition, as discussed above. If kernal panic does not occur as the current partition continues to be booted, the method 900 may include performing 924 OS bringup using the current partition. If kernal failure or a critical failure occurs, the method 900 may include triggering 922 a reboot of the OS from the current partition, starting with a boot 906 from a bootloader of the current partition, as discussed above. If kernal failure or a critical failure does not occur, the method 900 may include setting 926 the boot attempt counter to zero and running 928 the OS, which has booted successfully. The setting 926 of the boot counter to zero reflects that the OS booted successfully.

Figure 10:
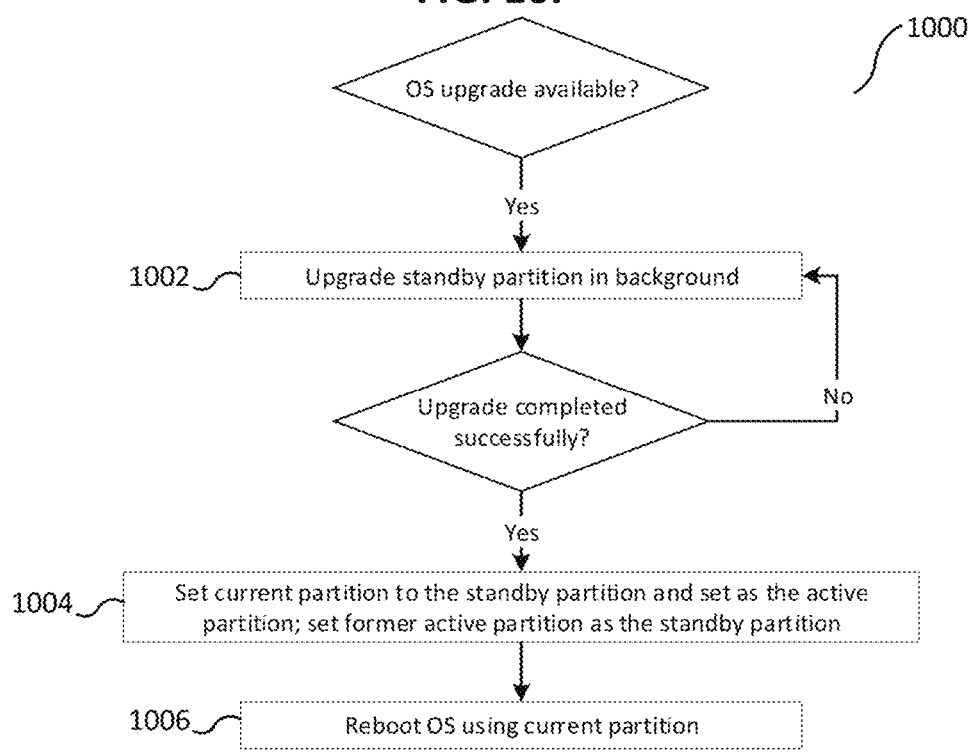
FIG. 10 illustrates a method for performing automated upgrade across multiple OS instances, according to some implementations of the current subject matter.

FIG. 10 illustrates one implementation of a method 1000 for performing automated upgrade across multiple OS instances, according to some implementations of the current subject matter. The method 1000 is described with respect to the implementation of FIGS. 7 and 8 and the method 900 of automated fallback of FIG. 9 for ease of explanation but can be implemented using another device, such as the device of FIG. 6, etc., and another method of automated fallback.

The method 1000 is performed while an OS is running on the device, such as after being successfully booted according to the method 900 of FIG. 9. As shown in FIG. 10, the method 1000 may begin when an OS upgrade is available. In some implementations, OS upgrades may be available on a predetermined time schedule, such as every six months or other time schedule, so as to provide atomic air gapped OS upgrades. In some implementations, OS upgrades may be available without accordance to any time schedule, e.g., OS upgrades are made available on an as-needed basis. In some implementations, some OS upgrades may be available on a predetermined time schedule and OS upgrades may be available without accordance to any time schedule.

In the method 1000, an OS upgrade being available may trigger an upgrade 1002 of the standby partition in the background of the OS running (as booted from the current partition). The upgrade 1002 may be performed in accordance with the particular OS's requirements. For example, in the configuration of FIG. 7, the upgrade 1002 may be for the second partition 708b. For another example, in the configuration of FIG. 8, the upgrade 1002 may be for the first partition 708a. In implementations in which a device includes a plurality of memories each including a plurality of partitions, each of the device's standby partitions may be upgraded 1002. For example, in the configuration of FIG. 6, the upgrade 1002 may be for the second partition 604b of the first memory 602 and the second partition 608b of the second memory 606.

In response to the upgrade 1002 being unsuccessful, the upgrade 1002 may be attempted again. The upgrade 1002 may be attempted any number of times. A previously unsuccessful upgrade may be successful if attempted again, such as if the previous attempt(s) were unsuccessful due to a temporary problem, such as network failure or power failure, that has since resolved. In some implementations, the upgrade 1002 may be attempted only once. In some implementations, the upgrade 1002 may be attempted any number of times within a predetermined period of time until the upgrade 1002 is either successful or the predetermined period of time expires, in which case the upgrade 1002 was unsuccessful. In some implementations, the upgrade 1002 may be attempted up to a predetermined number of times, with the upgrade 1002 either being successful or the upgrade 1002 having been attempted the predetermined number of times without being successful.

In response to the upgrade 1002 being successful, the method 1000 may include changing 1004 partition designations for the boot order so the newly upgraded standby partition becomes the current partition. The current partition is set to be the standby partition, the standby partition is designated as the active partition, and the formerly active partition is set as the standby partition.

After changing 1004 the partition designations, the method 1000 may include rebooting 1006 the OS using the current partition, e.g., the newly upgraded partition. The OS may thus be rebooted automatically in response to a successful OS upgrade, which may allow the device to run on the most current OS available.

Figure 11:
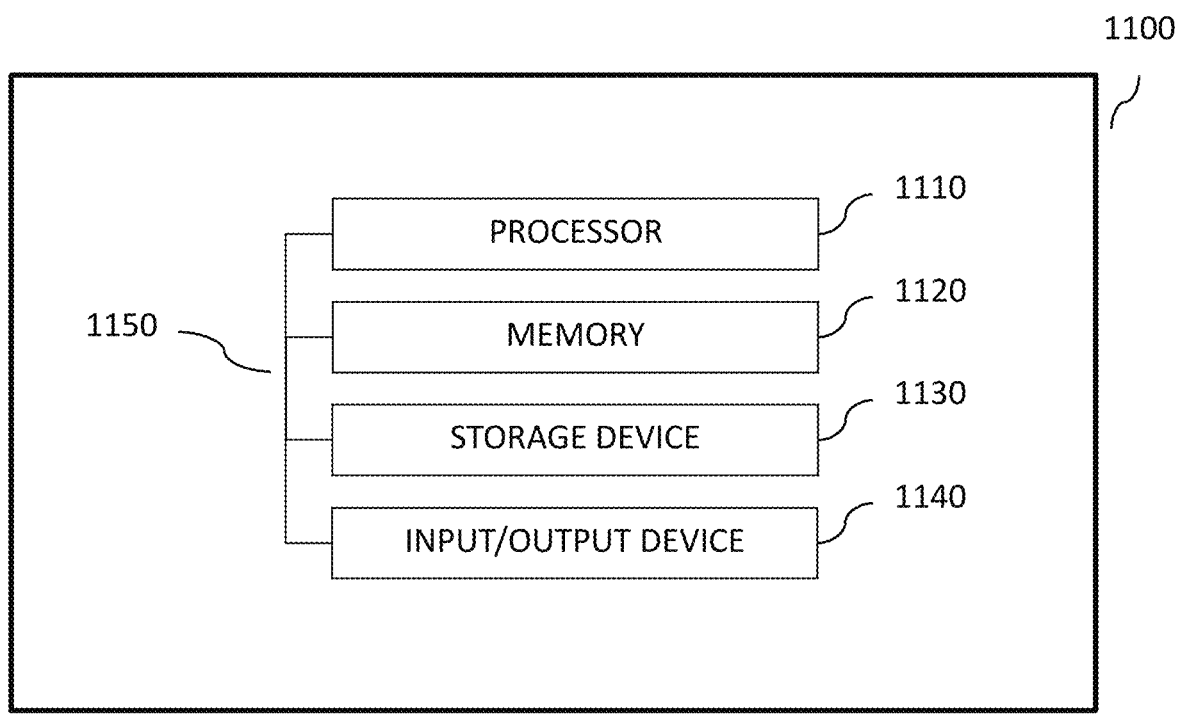
FIG. 11 illustrates an exemplary system, according to some implementations of the current subject matter.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 600. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
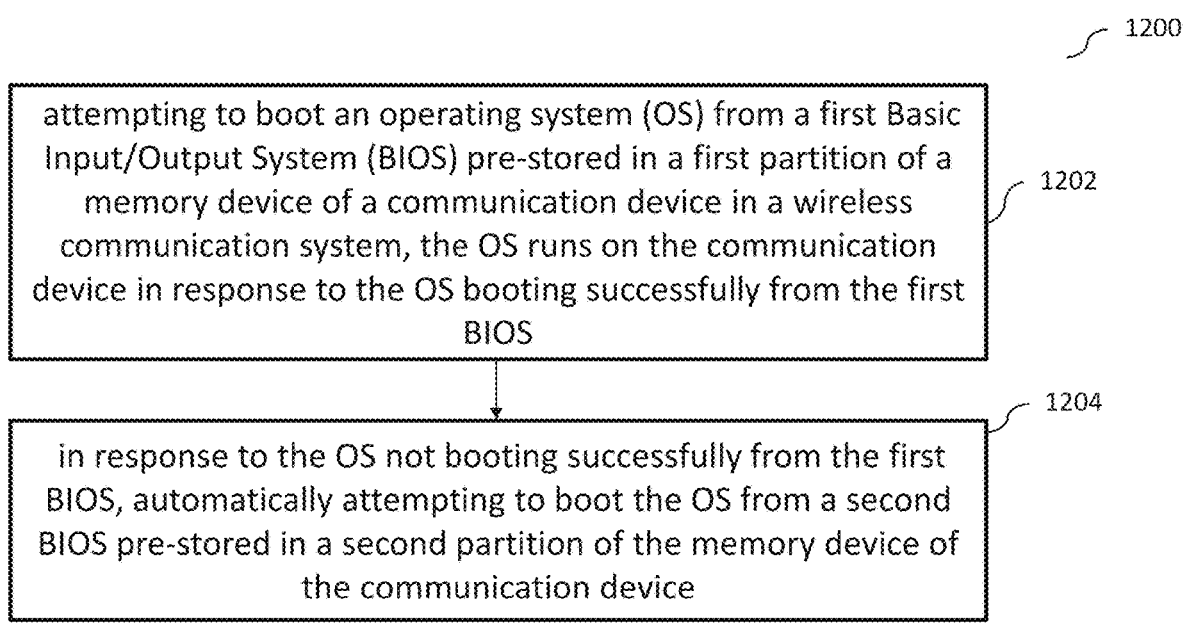
FIG. 12 illustrates an exemplary method, according to some implementations of the current subject matter.

FIG. 12 illustrates an exemplary method 1200 for automated upgrade and fallback across multiple OS instances, according to some implementations of the current subject matter. The method 1200 may be performed, for example, using implementations shown in and described with respect to FIGS. 6-8.

The method 1200 includes attempting 1202 to boot an OS from a first BIOS pre-stored in a first partition of a memory (e.g., the first memory 602 or the second memory 606 of FIG. 6, the memory 702 of FIGS. 7 and 8, the memory 1020 of FIG. 12, etc.) of a communication device (e.g., a DU such as the DU 304 of FIG. 3, the DU 508 or 510 of FIGS. 5*a*-5*c*, etc.; etc.) in a wireless communication system (e.g., a long term evolution communications system, a new radio communications system, etc.). The OS runs on the communication device in response to the OS booting successfully from the first BIOS. The method also includes, in response to the OS not booting successfully from the first BIOS, automatically attempting 1204 to boot the OS from a second BIOS pre-stored in a second partition of the memory of the communication device.

In some implementations, the current subject matter can include one or more of the following optional features.

In some implementations, the OS can run on the communication device in response to the OS booting successfully from the second BIOS, and the method can further include, in response to the OS not booting successfully from the second BIOS, automatically booting the OS from a third BIOS pre-stored in a third partition of the memory of the communication device. Further, the third BIOS can be pre-stored in the third partition of the memory during manufacturing of the communication device. Further, the first BIOS and the second BIOS can each be configured to be upgraded, and the third BIOS cannot be upgraded.

In some implementations, the method can further include during the running of the OS on the communication device, upgrading the second BIOS, and, in response to the second BIOS successfully upgrading, automatically rebooting the OS from the upgraded second BIOS. Further, the method can further include, after the rebooting and during the running of the OS on the communication device, upgrading the first BIOS, and, in response to the first BIOS successfully upgrading, automatically rebooting the OS from the upgraded first BIOS.

In some implementations, the first BIOS can have been pre-stored in the first partition of the memory during manufacturing of the communication device, the second BIOS can have been pre-stored in the second partition of the memory during manufacturing of the communication device, the second BIOS can be configured to be upgraded during the running of the OS booted successfully from the first BIOS, and the first BIOS can be configured to be upgraded during the running of the OS booted successfully from the second BIOS.

In some implementations, attempting to boot the OS from the first BIOS can include attempting to boot a first bootloader; and the method can further include, in response to the first bootloader boot failing, automatically attempting to boot the OS from the second BIOS, in response to the first bootloader boot succeeding, determining if bootloader booting has been attempted for the communication device more than a predetermined threshold number of times, in response to determining that the bootloader booting has not been attempted for the communication device more than the predetermined threshold number of times, continuing the attempt to boot the OS from the first BIOS, and, in response to determining that the bootloader booting has been attempted for the communication device more than the predetermined threshold number of times, automatically attempting to boot the OS from the second BIOS. Further, the method can further include, after continuing the attempt to boot the OS from the first BIOS, attempting to load a first kernel image of the first BIOS, in response to the first kernel image not successfully loading, triggering a reboot of the OS from the first BIOS, in response to the first kernel image successfully loading, attempting to load a first initrd image of the first BIOS, in response to the first initrd image not successfully loading, triggering a reboot of the OS from the first BIOS, and, in response to the first initrd image successfully loading, continuing the attempt to boot the OS from the first BIOS; and/or attempting to boot the OS from the second BIOS can include attempting to boot a second bootloader, and the method can further include, in response to the second bootloader boot failing, automatically booting the OS from a third BIOS pre-stored in a third partition of the memory of the communication device, in response to the second bootloader boot succeeding, determining if bootloader booting has been attempted more than the predetermined threshold number of times, in response to determining that the bootloader booting has not been attempted more than the predetermined threshold number of times, continuing the attempt to boot the OS from the second BIOS, and, in response to determining that the second bootloader booting has been attempted more than the predetermined threshold number of times, automatically attempting to boot the OS from the third BIOS. Further, the third BIOS can have been pre-stored in the third partition of the memory during manufacturing of the communication device. Further, the first BIOS and the second BIOS can each be configured to be upgraded, and the third BIOS cannot be upgraded.

In some implementations, the communication device can be a distributed unit (DU).

In some implementations, at least one of the attempting and the automatically attempting can be performed by a base station in the wireless communication system. Further, the base station can include at least one of an eNodeB base station, a gNodeB base station, a wireless base station, and any combination thereof.

In some implementations, the wireless communication system can be at least one of a long term evolution communications system, a new radio communications system, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
attempting to boot an operating system (OS) from a first Basic Input/Output System (BIOS) pre-stored in a first partition of a memory of a communication device in a wireless communication system, the attempting to boot the OS including attempting to boot a first bootloader;
wherein the OS runs on the communication device in response to the OS booting successfully from the first BIOS;
wherein the method further comprises, in response to the OS not booting successfully from the first BIOS, automatically attempting to boot the OS from a second BIOS pre-stored in a second partition of the memory of the communication device; and
wherein the method further comprises:
in response to the first bootloader boot succeeding, determining if bootloader booting has been attempted for the communication device more than a predetermined threshold number of times; and
in response to determining that the bootloader booting has not been attempted for the communication device more than the predetermined threshold number of times, attempting to load a first kernel image of the first BIOS.

2. The method of claim 1, wherein the OS runs on the communication device in response to the OS booting successfully from the second BIOS; and the method further comprises, in response to the OS not booting successfully from the second BIOS, automatically booting the OS from a third BIOS pre-stored in a third partition of the memory of the communication device.

3. The method of claim 2, wherein the third BIOS was pre-stored in the third partition of the memory during manufacturing of the communication device.

4. The method of claim 3, wherein the first BIOS and the second BIOS are each configured to be upgraded; and the third BIOS cannot be upgraded.

5. The method of claim 1, further comprising during the running of the OS on the communication device, upgrading the second BIOS; and in response to the second BIOS successfully upgrading, automatically rebooting the OS from the upgraded second BIOS.

6. The method of claim 5, further comprising, after the rebooting and during the running of the OS on the communication device, upgrading the first BIOS; and in response to the first BIOS successfully upgrading, automatically rebooting the OS from the upgraded first BIOS.

7. The method of claim 1, wherein the first BIOS was pre stored in the first partition of the memory during manufacturing of the communication device;

the second BIOS was pre stored in the second partition of the memory during manufacturing of the communication device;

the second BIOS is configured to be upgraded during the running of the OS booted successfully from the first BIOS; and the first BIOS is configured to be upgraded during the running of the OS booted successfully from the second BIOS.

8. The method of claim 1, further comprising:

in response to determining that the bootloader booting has been attempted for the communication device more than the predetermined threshold number of times, automatically attempting to boot the OS from the second BIOS.

9. The method of claim 8, further comprising:

in response to the first kernel image of the first BIOS not successfully loading, triggering a reboot of the OS from the first BIOS;

in response to the first kernel image of the first BIOS successfully loading, attempting to load a first initrd image of the first BIOS, in response to the first initrd image of the first BIOS not successfully loading, triggering a reboot of the OS from the first BIOS; and in response to the first initrd image of the first BIOS successfully loading, continuing the attempt to boot the OS from the first BIOS.

10. The method of claim 8, wherein attempting to boot the OS from the second BIOS includes attempting to boot a second bootloader; and the method further comprises:

in response to the second bootloader boot failing, automatically booting the OS from a third BIOS pre-stored in a third partition of the memory of the communication device, in response to the second bootloader boot succeeding, determining if bootloader booting has been attempted more than the predetermined threshold number of times, in response to determining that the bootloader booting has not been attempted more than the predetermined threshold number of times, attempting to load a second kernel image of the second BIOS, and in response to determining that the second bootloader booting has been attempted more than the predetermined threshold number of times, automatically attempting to boot the OS from the third BIOS.

11. The method of claim 10, wherein the third BIOS was pre-stored in the third partition of the memory during manufacturing of the communication device.

12. The method of claim 11, wherein the first BIOS and the second BIOS are each configured to be upgraded; and the third BIOS cannot be upgraded.

13. The method of claim 1, wherein the communication device is a distributed unit (DU).

14. The method of claim 1, wherein at least one of the attempting and the automatically attempting is performed by a base station in the wireless communication system.

15. The method of claim 14, wherein the base station includes at least one of an eNodeB base station, a gNodeB base station, a wireless base station, and any combination thereof.

16. The method of claim 1, wherein the wireless communication system is at least one of a long term evolution communications system, a new radio communications system, and any combination thereof.

17. An apparatus, comprising:

at least one processor, and at least one non-transitory storage media storing instructions that, when executed by the at least one processor, cause the at least one processor to perform operations comprising:

attempting to boot an operating system (OS) from a first Basic Input/Output System (BIOS) pre-stored in a first partition of a memory of a communication device in a wireless communication system, the attempting to boot the OS including attempting to boot a first bootloader;

wherein the OS runs on the communication device in response to the OS booting successfully from the first BIOS;

wherein the operations further comprise, in response to the OS not booting successfully from the first BIOS, automatically attempting to boot the OS from a second BIOS pre-stored in a second partition of the memory of the communication device; and wherein the operations further comprise:

in response to the first bootloader boot succeeding, determining if bootloader booting has been attempted for the communication device more than a predetermined threshold number of times; and in response to determining that the bootloader booting has not been attempted for the communication device more than the predetermined threshold number of times, attempting to load a first kernel image of the first BIOS.

18. At least one non-transitory storage media storing instructions that, when executed by at least one processor, cause the at least one processor to perform operations comprising:
- attempting to boot an operating system (OS) from a first Basic Input/Output System BIOS) pre-stored in a first partition of a memory of a communication device in a wireless communication system, the attempting to boot the OS including attempting to boot a first bootloader;
- wherein the OS runs on the communication device in response to the OS booting successfully from the first BIOS;
- wherein the operations further comprise, in response to the OS not booting successfully from the first BIOS, automatically attempting to boot the OS from a second BIOS pre-stored in a second partition of the memory of the communication device; and
- wherein the operations further comprise:
- in response to the first bootloader boot succeeding, determining if bootloader booting has been attempted for the communication device more than a predetermined threshold number of times; and
- in response to determining that the bootloader booting has not been attempted for the communication device more than the predetermined threshold number of times, attempting to load a first kernel image of the first BIOS.

* * * * *